United States Patent
Horibe et al.

(10) Patent No.: US 8,413,531 B2
(45) Date of Patent: Apr. 9, 2013

(54) SMALL SLIDER UNIT

(75) Inventors: Hirofumi Horibe, Gifu (JP); Tetsuya Sakai, Gifu (JP)

(73) Assignee: Nippon Thompson Co., Ltd., Tokyo (JP)

( * ) Notice: Subject to any disclaimer, the term of this patent is extended or adjusted under 35 U.S.C. 154(b) by 533 days.

(21) Appl. No.: 12/338,626

(22) Filed: Dec. 18, 2008

(65) Prior Publication Data

US 2009/0183586 A1 Jul. 23, 2009

(30) Foreign Application Priority Data

Jan. 18, 2008 (JP) ................. 2008-009223

(51) Int. Cl.
- *F16H 3/06* (2006.01)
- *F16H 27/02* (2006.01)
- *F16H 29/02* (2006.01)
- *F16H 29/20* (2006.01)
- *F16C 17/00* (2006.01)

(52) U.S. Cl.
USPC .............................. 74/89.32; 384/8

(58) Field of Classification Search .............. 74/89.23, 74/89.32–89.34, 89.37; 384/8, 7
See application file for complete search history.

(56) References Cited

U.S. PATENT DOCUMENTS

| | | | | |
|---|---|---|---|---|
| 5,047,676 A * | 9/1991 | Ichikawa | ................... | 310/12.27 |
| 5,273,381 A * | 12/1993 | Shirai | ........................... | 409/219 |
| 5,311,788 A * | 5/1994 | Kasuga | ........................ | 74/89.33 |
| 5,499,547 A * | 3/1996 | Nagai et al. | ................... | 74/89.34 |
| 5,606,256 A * | 2/1997 | Takei | ........................ | 324/207.21 |
| 5,608,317 A * | 3/1997 | Hollmann | ................... | 324/207.2 |
| 5,799,543 A * | 9/1998 | Nagai et al. | ................. | 74/490.09 |
| 6,178,837 B1 * | 1/2001 | Nagai et al. | .................. | 74/89.23 |
| 6,240,796 B1 * | 6/2001 | Yamada | ........................ | 74/89.23 |
| 6,333,628 B1 * | 12/2001 | Yeh et al. | ................. | 324/207.24 |
| 6,346,788 B1 * | 2/2002 | Nagai et al. | ................... | 318/432 |
| 6,588,289 B2 * | 7/2003 | Ung et al. | ....................... | 74/89.4 |
| 6,655,225 B1 * | 12/2003 | Nagai et al. | .................. | 74/89.33 |
| 7,410,299 B2 * | 8/2008 | Rudy et al. | ........................ | 384/8 |
| 7,547,141 B2 * | 6/2009 | Chen et al. | ........................ | 384/8 |
| 2005/0115343 A1 * | 6/2005 | Sakamaki | .................... | 74/89.23 |
| 2005/0132830 A1 * | 6/2005 | Gerbier et al. | .............. | 74/89.23 |
| 2008/0229851 A1 * | 9/2008 | Jones et al. | ................... | 74/89.39 |

FOREIGN PATENT DOCUMENTS

JP 3927285 6/2007

* cited by examiner

*Primary Examiner* — Justin Krause
(74) *Attorney, Agent, or Firm* — Cozen O'Connor

(57) ABSTRACT

For achievement of a reduction in size, a slider unit comprises a mounting base 1, a rail 2 fixed to a mounting face 1*a* of the mounting base 1, a slide table 3 moving along the rail, position detection means for detecting the position of the slide table 3, and a driving system for moving the slide table 3. The mounting face 1*a* of the mounting base 1 has a mounting recess 14 formed therein. A sensor board 16 on which a Hall element 16*a* is mounted is installed in the mounting recess 14. The slide table 3 has a permanent magnet 19 attached to the face thereof facing the mounting face 1*a*. The permanent magnet 19 and the Hall elements 16*a* form the position detection means.

3 Claims, 5 Drawing Sheets

SMALL SLIDER UNIT

BACKGROUND OF THE INVENTION

1. Field of the Invention

This invention relates to a small slider unit having a slide table moving along a rail.

2. Description of the Related Art

This type of slider units is conventionally known from, for example, FIG. 12 in Japanese Patent No. 3927285. Such a slider unit includes a slide table moving on a rail fixed to a mounting base, and position detection means for detecting the position of the moving slide table. The position detection means of the slider unit is made up of, for example, a proximity sensor or a photosensor which is fixed to a mounting base, and a dog (i.e., a detection element) attached to the slide table to cause the sensor to detect the slide table.

In the slider unit comprising such position detection means, when the dog comes near the sensor, the position of the slide table is detected, so that, for example, the slide table can be stopped at the stroke end or the zero point adjustment can be performed for alignment of the slide table.

Such a slider unit as described above is used in various situations. For conveyance of a very-small work piece, the slider unit is required to be correspondingly reduced in size.

For example, when the slider unit is used to convey a semiconductor device, the size of the slide table can be significantly reduced because the work piece is very small and very light in weight.

However, in conventional slider units, the sensors are situated outside the slide table in the lateral direction (outside the movement path of the slide table), while the dogs protrudes from the slide table in the lateral direction so as to face the sensors (see FIG. 14 of in Japanese Patent No. 3927285).

Accordingly, when the slide table is reduced in size, the placement of the positional detection means unavoidably involves the problem of a limit to the reduction in size of the entire slider unit in the lateral direction.

SUMMARY OF THE INVENTION

It is an object of the present invention to provide a slider unit having a size effectively reduced in the lateral direction.

An aspect of the present invention provides a small slider unit which comprises:

a mounting base; a rail fixed to the mounting face of the mounting base; a slide table moving along the rail; position detection means for detecting a position of the slide table; and a driving system for moving the slide table. In the small slider unit, the mounting base has a mounting recess formed in the mounting face. A sensor board on which a Hall element is mounted is installed in the mounting recess. A permanent magnet is attached to a face of the slide table facing the mounting face. The Hall element and the permanent magnet form the position detection means.

In the aforementioned small slider unit, the slide table is preferably provided with a guide member capable of sliding on the rail, and the permanent magnet attached to the slide table preferably maintains a dimensional relationship with the guide member in which the permanent magnet does not extend further toward the mounting base from a level corresponding to a base-facing face of the guide member facing the mounting base.

According to the present invention, the Hall elements and the permanent magnet, which form the position detection means, are respectively provided on the mutual-facing faces of the slide table and the mounting base. This design makes it possible to reduce the size of the slider unit in the lateral direction as compared with the conventional slider units having the position detection means arranged outward in the lateral direction of the slider table.

Further, because the sensor board on which the Hall element is mounted is installed in the mounting recess formed in the mounting base, there is no necessity to increase the size in the height direction of the slider unit.

If a thick sensor board is mounted on the mounting base, the mounting recess will be required to be increased in depth, resulting in an increase in size in the height direction of the slider unit. However, the thickness of the Hall element is very thin, so that the sensor board with the thin Hall element mounted can equally be made thin. As a result, even when the sensor board is installed in the mounting base, this does not cause an increase in the size of the slider unit in the height direction.

In particular, in a small slider unit even a slight change in dimensions greatly affects the entire size of the slider unit. Because of this, having a sensor board with a small thickness is effective for a small slider unit.

According to the present invention, further, the permanent magnet secured on the slide table does not extend further toward the mounting base from the level corresponding to the mounting-base-facing surface of the guide member sliding on the rail. For this reason, the permanent magnet, even if it is disposed between the slide table and the mounting base, does not affect the size of the slider unit in the height direction. In consequence, a reduction in size of the entire slider unit can be effectively realized.

BEST MODE FOR CARRYING OUT THE INVENTION

A slider unit of an embodiment according to the present invention will be described below with reference to FIG. 1 to FIG. 5.

Figure 1:
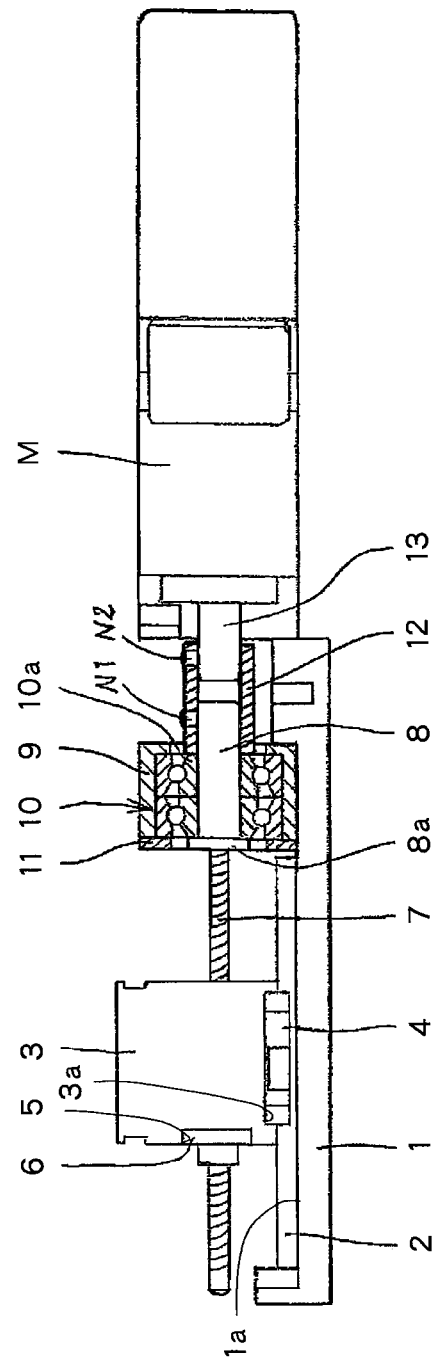
FIG. 1 is a schematic diagram of a slider unit of an embodiment according to the present invention.
Figure 2:
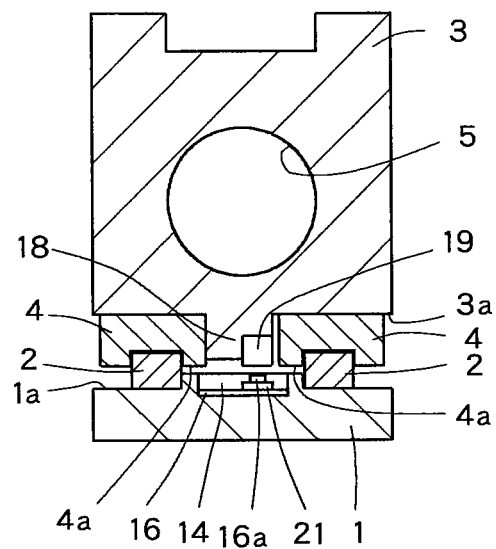
FIG. 2 is a cross-sectional view of the slider unit when viewed from a motor.

As illustrated in FIGS. 1 and 2, a pair of parallel rails 2 are mounted on an upwardly facing mounting face 1a of a mounting base 1, such that a slide table 3 moves along the rails 2. Specifically, the slide table 3 has downwardly facing faces 3a facing the mounting face 1a, and C-shaped cross-section guide members 4 are provided on the respective faces 3a. The guide members 4 slidably straddle the respective rails 2.

The slide table 3 has a hole 5 extending therethrough in the axis direction of the rail 2. A ball nut 6 is fixed in the hole 5 and then a screw connection is established between the ball nut 6 and the screw groove of the screw shaft 7. As a result, when the screw shaft 7 is rotated, the rotational force causes the ball nut 6 and the slide table 3 to move in one piece along the rails 2.

Figure 3:
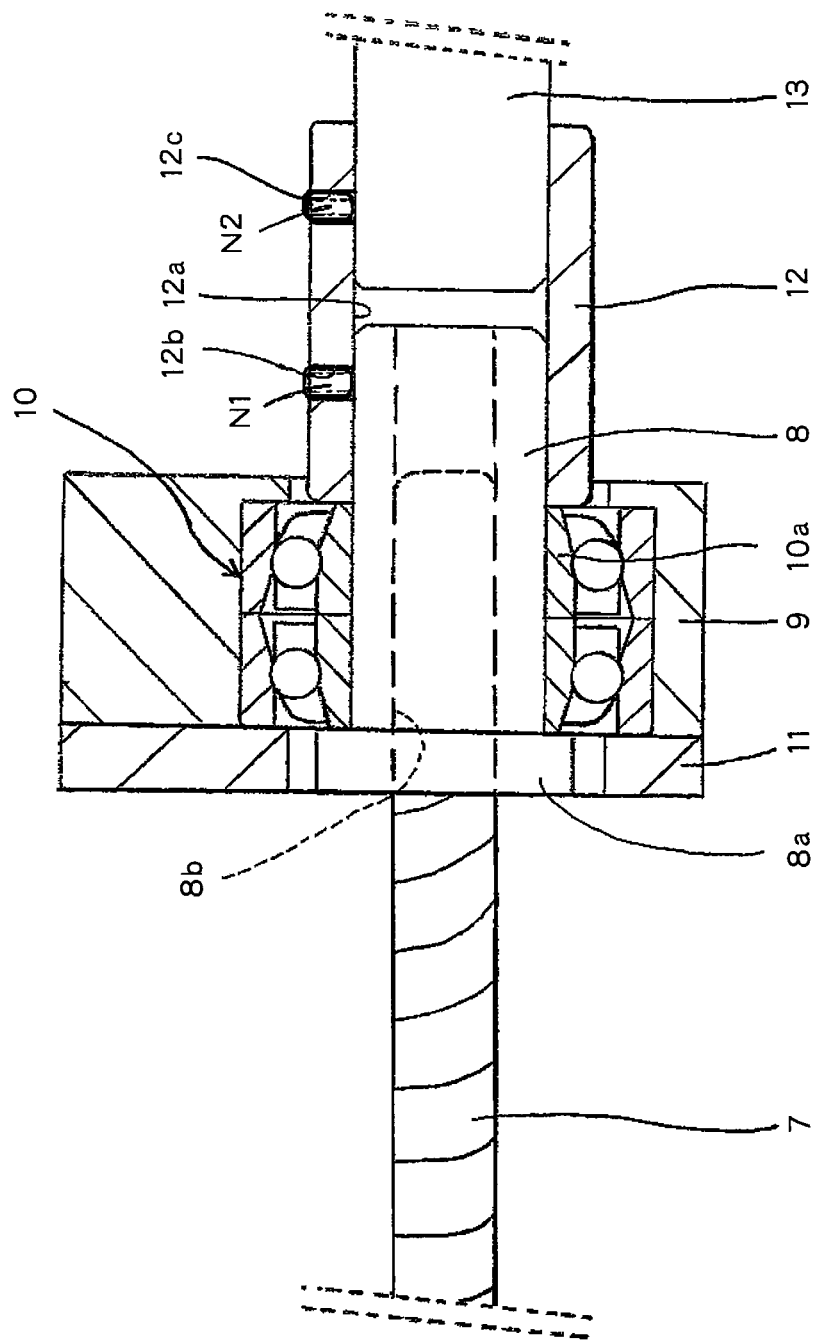
FIG. 3 is an enlarged view of a portion of the slider unit according to the embodiment.

As shown in FIG. 3, one end of the screw shaft 7 is fixedly press-fitted into a cap member 8. The cap member 8 has a flange 8a formed at its one end in the longitudinal direction and a through hole 8b extending between the end at which the flange 8a is formed and the other end. The inner diameter of the through hole 8b is slightly smaller than the diameter of the screw shaft 7, so that when the screw shaft 7 is press-fitted into the cap member 8, the screw shaft 7 and the cap member 8 are joined together. Note that the screw shaft 7 may be press-fitted into a hole having a closed end, instead of the through hole.

On the other hand, to the mounting base 1 a casing 9 is fixed. The casing 9 has a hole through which the cap member 8 passes. An angular bearing 10 is incorporated in the hole of the casing 9, and a lid member 11 is fixedly attached to the open end of the hole of the casing 9 to prevent the angular bearing 10 from falling out of the casing 9.

The angular bearing 10 as described above has an inner ring 10a into which the cap member 8 is inserted. The flange 8a is in contact with the inner ring 10a. The end of the cap member 8 opposite to the end at which flange 8a is provided extends outward from the inner ring 10a. This protruding portion of the cap member 8 is fitted over a coupling member 12. The coupling member 12 and the cap member 8 are locked together by a set screw N1 so as to rotate in one piece.

The angular bearing 10 is fixedly interposed between the coupling member 12 and the flange 8a by securing the coupling member 12 as described above. As a result, the cap member 8 and the screw shaft 7 to which the cap member 8 is fixed are inhibited from rattling in the axis direction.

A rotating shaft 13 of a motor M is inserted into the end of the coupling member 12 opposite to the end into which the cap member 8 is inserted. The rotating shaft 13 is fastened to the coupling member 12 by use of a set screw N2, such that the coupling member 12 and the rotating shaft 13 rotate as one piece. As a result, when the rotating shaft 13 is rotated by driving the motor M, the coupling member 12, the cap member 8 and the screw shaft 7 are together rotated concurrently with the rotation of the rotating shaft 13. In addition, upon the rotation of the screw shaft 7, the slide table 3 also moves along the rails 2.

Figure 4:
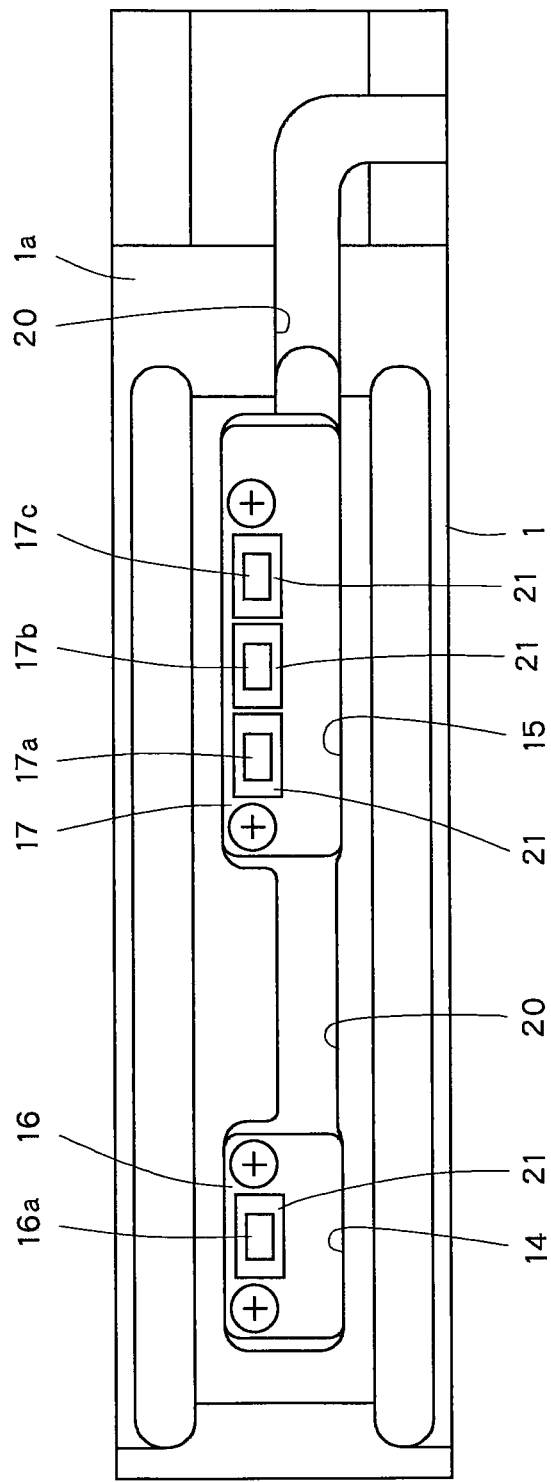
FIG. 4 is a top view of a mounting base.
Figure 5:
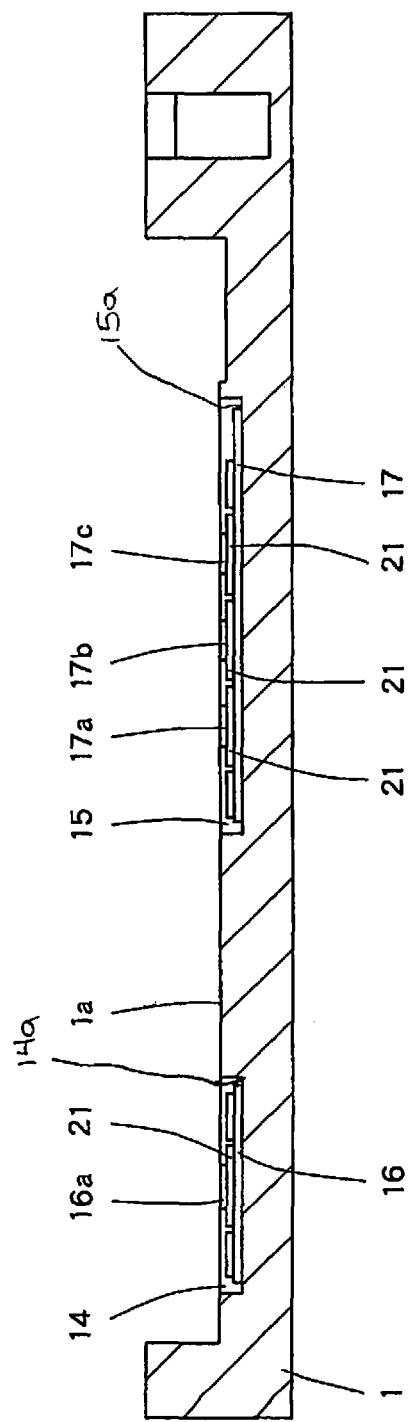
FIG. 5 is a side view of the mounting base.

As illustrated in FIGS. 4 and 5, mounting recesses 14, 15 each having a depth of 1.5 mm are formed in the mounting face 1a of the mounting base 1. Boards 16, 17 are attached to the respective mounting recesses 14, 15 adjacent to a bottom surface 141, 15a of each of the respective recesses, as seen in FIG. 5. A Hall element 16a is mounted on the board 16, and three Hall elements 17a, 17b, 17c are mounted on the board 17 in order in the longitudinal direction of the rail 2. The boards, the mounting recesses and the Hall elements are designed in a dimensional relationship such that, when the boards 16, 17 are attached to the mounting recesses 14, 15, the top faces of the Hall elements 16a, 17a, 17b, 17c, that is, the faces facing the slide table 3, do not protrude from the mounting recesses 14, 15. Specifically, the total thickness of the thickness of each of the boards 16, 17 and the thickness of each of the Hall elements 16a, 17a, 17b, 17c is about 1.4 mm and the depth of each of the mounting recesses 14, 15 is 1.5 mm.

The reference numerals 21 in FIGS. 2, 4 and 5 denote the soldering areas respectively provided for mounting the Hall elements 16a, 17a, 17b, 17c on the boards 16, 17.

The boards 16, 17 are connected to a plurality of wires connected to the power source, not shown. During the passage of current through the Hall elements 16a, 17a, 17b, 17c, a magnetic field is applied to these Hall elements to induce an electromotive force (Hall voltage). The electromotive force is supplied through the wires to a control system. The control system referred to herein is a system for controlling the driving of the motor M on the basis of detection signals sent from the Hall elements 16a, 17a, 17b, 17c. The wires connected to the Hall elements 16a, 17a, 17b, 17c are housed in a wiring recess 20 which is formed in the mounting face 1a (see FIG. 4). Because of this, the disadvantage of each wire being exposed from the mounting face 1a of the mounting base 1 and thus obstructing the movement of the slide table 3 does not occur.

As shown in FIG. 2, a protrusion 18 protrudes from the face 3a of the slide table 3 toward the mounting face 1a of the mounting base 1. A permanent magnet 19 is secured to a portion of the protrusion 18 where the permanent magnet 19 can faces each of the Hall elements 16a, 17a, 17b, 17c on the boards 16, 17 in the process of moving the slide table 3 along the rails 2.

Accordingly, during the passage of current through the Hall elements 16a, 17a, 17b, 17c, when the permanent magnet 19 approaches each of the Hall elements 16a, 17a, 17b, 17c, an electromotive force is induced in the Hall element 16a, 17a, 17b, 17c. That is, each of the Hall elements 16a, 17a, 17b, 17c and the permanent magnet 19 form position detecting means for detecting the position of the slide table 3.

When the permanent magnet 19 faces each of the Hall elements 16a, 17a, 17b, 17c, the distance between the permanent magnet 19 and the corresponding Hall element is 0.5 mm.

As shown in FIG. 2, the permanent magnet 19 provided on the protrusion 18 is located between the opposing faces of the respective guide members 4, and is designed to have a dimensional relationship such that the permanent magnet 19 does not extend further toward the mounting base 1 from the level corresponding to the base-facing face 4a of the guide member 4 facing the mounting base 1. In other words, the provision of the protrusion 18 and the permanent magnet 19 does not involve an increase in the size of the slide table 3 in the height direction.

On the other hand, the control system uses the electromotive forces induced in the Hall elements 16a, 17a, 17b, 17c as signals to control the driving of the motor M. In the embodiment, the Hall elements 16a and 17c function as limit sensors, the Hall element 17a functions as a pre-zero-point sensor, and the Hall element 17b functions as a zero-point sensor.

The slide table 3 basically moves within a range in which the Hall elements 16a and 17c do not induce an electromotive force (within a range in which the control system does not detect a signal). However, the slide table 3 may possibly overrun for some reason. If the slide table 3 overruns, a work piece on the slide table 3 may possibly come into collision with another device, apparatus or the like and suffer damage or breakage.

To avoid this, the Hall elements 16a and 17c are provided as limit sensors. When the control system detects a signal sent from the either Hall element 16a or 17c, the control system stops the driving of the motor M so as to stop the movement of the slide table 3.

For example, a description will be given of the possible event that, in the movement of the slide table 3 along the rails 2 in the left direction in FIG. 1 by the motor M rotated in the normal direction, the slide table 3 overruns and the permanent magnet 19 reaches a position close to the Hall element 16a. In this case, an electromotive force is induced in the Hall element 16a, and then the control system detects the electromotive force as a signal, and then stops the driving the motor M to stop the movement of the slide table 3.

On the other hand, in the case where the slide table 3 moves in the right direction in FIG. 1, when the slide table 3 overruns, the Hall elements 17c functions as the limit sensor as in the previous case.

In turn, the Hall elements 17a, 17b are used to align the slide table 3 with the zero point, for example, when the unit is powered. Specifically, upon the powering of the unit, the control system drives the motor M to move the slide table 3. Then, when the permanent magnet 19 on the slide table 3 reaches a position close to the Hall element 17a, the control system decelerates the motor M to move the slide table 3 at a low speed in the right-hand direction in FIG. 1.

When the slide table 3 moves slowly and the permanent magnet 19 reaches a position close to the Hall element 17b, the control system stops the driving of the motor M.

In this manner, the use of the Hall element 17a as a pre-zero-point sensor and the Hall element 17b as a zero-point sensor makes it possible to place the slide table 3 in a fixed position at all times when the unit is powered.

In the slider unit according to the embodiment, because the position detection means is provided on the mounting face 1a of the mounting base 1 and the face 3a of the slide table 3, it is possible to reduce the size of the slider unit as compared with a conventional structure having the position detection means provided outward in the lateral direction of the slide table 3.

Also, because the mounting recesses 14, 15 are formed in the mounting face 1a and the boards 16, 17 are installed in the mounting recesses 14, 15, a reduction in size of the slider unit in the height direction is made possible.

The foregoing embodiment has described the case when a pair of rails 2 are secured on the mounting face 1a. However, for example, a rail 2 alone may be laid on the central portion of the mounting face 1a. In this case, the permanent magnet 19 can face the Hall elements in positions which avoid the rail 2. In addition, as in the case of the aforementioned embodiment, as long as a guide member 4 sliding on the rail 2 is provided and the dimensional relationship is maintained such that the permanent magnet 19 does not extend further toward the mounting base 1 from the level corresponding to the base-facing face 4a of the guide member 4 facing the mounting base 1, the provision of the permanent magnet 19 does not affect the size of the slider unit in the height direction.

In the aforementioned embodiment has described the two boards 16, 17 installed in the mounting base 1. However, any number of boards can be provided for forming the position detection means. In addition, the number of Hall elements mounted on the board and the control of the control system can be determined as appropriate.

Further, in the dimensional relationship between the Hall elements and the mounting recesses described in the embodiment, when the boards 16, 17 are mounted on the mounting recesses 14, 15, the top faces of the Hall elements 16a, 17a, 17b, 17c do not protrude from the mounting recesses 14, 15. However, it goes without saying that the top face of each Hall element may be flush with the mounting face 1a, or alternatively, may slightly protrude from the mounting recesses 14, 15 within the range in which the top face of the Hall element does not come into contact with the permanent magnet 19.

What is claimed is:

1. A slider unit, comprising:
a mounting base having an upwardly facing rail-mounting face;
a pair of spaced rails fixed to the upwardly facing rail-mounting face of the mounting base;
a slide table having a downwardly facing face facing the upwardly facing rail-mounting face moving along the rails, said slide table also having a ball nut fixed in a hole, whereby a screw connection is established between the ball nut and a screw groove of a screw shaft, such that when the screw shaft is rotated, the ball nut and the slide table move in one piece along the rails;
position detection means for detecting a position of the slide table; and
a driving system for moving the slide table,
wherein the mounting base has a mounting recess formed in the upwardly facing rail-mounting face to which the pair of rails are fixed, said recess being located below said upwardly facing rail-mounting face in an area between the pair of rails,
a sensor board on which a Hall element is mounted is installed in the mounting recess,
a pair of guide members provided on the downwardly facing face of the slide table, each guide member having a respective downwardly facing face that faces the upwardly facing rail-mounting face, said pair of guide members having opposed parts and being configured to slide on the pair of rails,
a permanent magnet attached to the slide table between the opposed parts of the guide members and in a position corresponding to an area between the spaced rails, and
the permanent magnet attached to the slide table maintains a dimensional relationship with the guide members in which the permanent magnet does not extend further toward the mounting base than a level corresponding to the downwardly facing faces of the guide members facing the mounting base,
and wherein the permanent magnet faces the Hall element thereby inducing an electromotive force to control the driving of a motor to move the slide table along the rails.

2. A slider unit as recited in claim 1 wherein said mounting recess has a depth extending from said upwardly facing mounting face of said mounting base to a bottom surface of said recess, and wherein said sensor board on which said Hall element is mounted is installed in the mounting recess adjacent to said bottom surface thereof.

3. A slider as recited in claim 1 wherein said depth of said mounting recess is about 1.5 mm and said total thickness of said sensor board and Hall element is about 1.4 mm.

* * * * *